(12) United States Patent
Park (10) Patent No.: US 7,656,492 B2
(45) Date of Patent: Feb. 2, 2010

(54) LIQUID CRYSTAL DISPLAY DEVICE USING IN-PLANE SWITCHING MODE HAVING PARTICULAR PIXEL ELECTRODES

(75) Inventor: Jong-Jin Park, Anyang (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 12/345,235

(22) Filed: Dec. 29, 2008

(65) Prior Publication Data

US 2009/0174854 A1 Jul. 9, 2009

(51) Int. Cl.
G02F 1/1343 (2006.01)
G02F 1/136 (2006.01)
(52) U.S. Cl. .................. 349/141; 349/42; 349/43
(58) Field of Classification Search .......... 349/141, 349/42, 43
See application file for complete search history.

(56) References Cited

U.S. PATENT DOCUMENTS

| | | | |
|---|---|---|---|
| 5,517,343 A * | 5/1996 | Yamahara et al. ............ 349/123 |
| 6,704,066 B2 * | 3/2004 | Tsumura et al. ............... 349/42 |
| 7,499,115 B2 * | 3/2009 | Kumagawa et al. ........... 349/37 |
| 2004/0125057 A1 * | 7/2004 | Moon et al. .................. 345/87 |
| 2005/0046763 A1 * | 3/2005 | Ono et al. ..................... 349/39 |

* cited by examiner

Primary Examiner—Mike Qi
(74) Attorney, Agent, or Firm—Brinks Hofer Gilson & Lione

(57) ABSTRACT

An in-plane switching (IPS) mode liquid crystal display (LCD) device is described which does not contain a common electrode. In the IPS mode LCD device. In the IPS display device, a pixel is defined by gate lines and data lines that cross each other. One or more switching devices are formed at the pixel. First and second electrodes are disposed at the pixel. The first electrode is connected with one of the data lines through the switching device and the second electrode is connected with another of the data lines through another switching device. The other switching device is either formed at the pixel or formed at an adjacent pixel. The data lines, and thus the first and second electrodes, have different potentials applied thereto, thereby forming an electric field without using a common electrode.

15 Claims, 6 Drawing Sheets

LIQUID CRYSTAL DISPLAY DEVICE USING IN-PLANE SWITCHING MODE HAVING PARTICULAR PIXEL ELECTRODES

CLAIM FOR PRIORITY

This application claims the benefit of the Korean Patent Application No. P2004-118365 filed on Dec. 31, 2004, which is hereby incorporated by reference.

FIELD OF THE INVENTION

The present invention relates to an in-plane switching (IPS) mode liquid crystal display (LCD) device, and more particularly, to an IPS mode LCD device not having common electrode forming a horizontal field with adjacent horizontal electrodes.

DESCRIPTION OF THE RELATED ART

As many kind of portable electric device such as a mobile phone, a PDA, and a notebook are in increasing demand, the demand for a flat panel display device having light, thin, short, and small characteristics has concurrently increased.

Among the flat panel display devices, such as a liquid crystal display (LCD) device, a plasma display panel (PDP), a field emission display (FED), a vacuum fluorescent display (VFD), etc, the LCD device is most ubiquitous due to the massive production, simple driving method, and high picture quality.

The LCD device displays an image by controlling the optical transmittance of the liquid crystal by using an electric field. The LCD device is provided with a liquid crystal display panel having pixels arranged in a matrix form, and a driving circuit for driving the liquid crystal panel.

Figure 1:
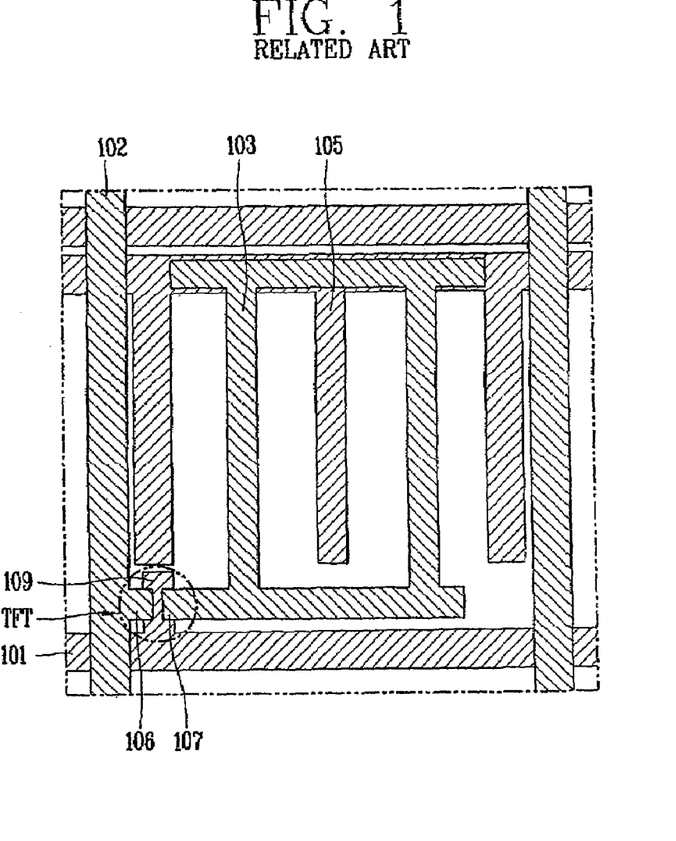
FIG. 1 is a plane view showing an IPS mode LCD device in accordance with the related art.

FIG. 1 shows a unit pixel of an IPS mode LCD device in accordance with the related art. As shown in FIG. 1, gate lines 101 and data lines 102 crossing each other define a pixel region. A thin film transistor (TFT) as a switching device is formed at an intersection between the gate lines 101 and the data lines 102. At each pixel of the liquid crystal display panel, a pixel electrode 103 and a common electrode 105 are alternately arranged. The pixel electrode 103 receives a data signal from source/drain electrodes 106 and 107 of the TFT thereby to form a horizontal field with the common electrode on the first substrate.

The LCD device displays an image by controlling optical transmittance of the liquid crystal by an electric field applied between the pixel electrode 103 and the common electrode 105 according to data signals supplied to each pixel electrode.

Although not shown, a second substrate, a color filter substrate is formed to face to the first substrate, and a liquid crystal layer is formed at a gap between the first substrate and the second substrate.

Liquid crystal molecules of the liquid crystal layer are driven by a horizontal field formed between the pixel electrode 103 and the common electrode 105. Accordingly, the IPS mode LCD device has a wider viewing angle than that of an LCD device driven by a twisted nematic (TN) mode thereby to obtain a viewing angle corresponding to approximately 80~85° in right and left directions and in up and down directions.

Figure 2:
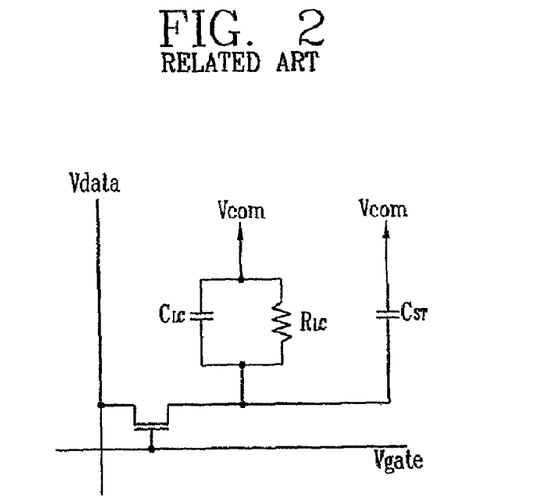
FIG. 2 is a circuit diagram showing a unit pixel of the IPS mode LCD device in accordance with the related art.

FIG. 2 is a circuit diagram showing a unit pixel of an IPS mode LCD device. Referring to FIG. 2, a thin film transistor (TFT), a switching device is formed at an intersection between a gate line (Vgate) and a data line (Vdata). The TFT is connected to a pixel electrode (not shown) for applying an electric field to liquid crystal. A horizontal field is formed between the pixel electrode and the common electrode (Vcom). In addition, the pixel electrode, the common electrode, and the liquid crystal layer form one capacitor ($C_{LC}$). The pixel electrode, the common electrode, and an insulating layer formed between the pixel electrode and the common electrode further form a storage capacitor ($C_{ST}$), and maintain a data signal.

As the LCD device becomes larger, the gate line and the data line arranged in horizontal and vertical directions on the substrate become long thereby to increase the linear resistance. Accordingly, TFTs formed on one gate line are not constantly driven, which is called as a line delay phenomenon. That is, even if a scan signal is applied to one gate line, if the gate line is long, the first TFT and the $N^{th}$ TFT receive different scan signals due to a linear resistance.

Also, since a large sized LCD panel is not formed by a single photo mask process, several photo mask processes are performed to fabricate a LCD panel. Therefore, TFTs formed by each photo mask process may have different characteristics, which realize different picture qualities at each unit pixel and lower the picture quality.

Also, in the related IPS mode LCD device, a pixel electrode and a common electrode are provided in parallel with each other to apply a horizontal field. However, since the common electrode decreases the aperture ratio, the common electrode line is adjacent to the gate line in order to maximize the pixel region. During the process, a short-circuit may be generated between the gate line and the common electrode line.

SUMMARY OF THE INVENTION

An in-plane switching (IPS) mode LCD device is provided that prevents lowering of the picture quality due to a line delay or different characteristics between TFTs by forming a horizontal field between electrodes formed at adjacent pixels without constructing a common electrode. A method of fabricating the IPS mode LCD device contains simple processes in which problems are avoided such as short between gate lines and common lines generated when forming the gate lines.

By way of introduction only an IPS mode comprises: a pixel defined by a plurality of gate lines and a plurality of data lines crossing each other; a pair of switching devices formed at an intersection between the gate line and the data line and formed at the pixel, one of the pair of switching devices connected to one of the data lines and the other of the pair of switching devices connected to another of the data lines; and a first electrode and a second electrode respectively connected to the pair of switching devices.

According to another aspect of the present invention, an IPS mode LCD device is provided that comprises: a pixel defined by a plurality of gate lines and a plurality of data lines crossing each other; a switching device formed at the pixel; and a first and second electrode formed at the pixel. The first electrode is connected to the switching device and the second electrode extends from the first electrode formed at an adjacent pixel.

According to another aspect of the present invention, an in-plane switching (IPS) mode display device comprises: a pixel defined by a plurality of gate lines and a plurality of data lines crossing each other; a switching device formed at the pixel; and a first electrode and a second electrode disposed at the pixel. The first electrode is connected with one of the data lines through the switching device and the second electrode is connected with another of the data lines.

The foregoing features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An IPS mode LCD device according to a first embodiment of the present invention is provided with a pair of switching devices formed at each unit pixel, and a horizontal electrode respectively connected to the switching devices. Also, in the IPS mode LCD device, a common electrode is not formed, and a horizontal field is formed between horizontal electrodes respectively applied to adjacent data lines. That is, a horizontal field is formed by a first horizontal electrode that receives a data voltage through a first switching device connected to a first data line and by a second horizontal electrode that receives a data voltage through a second switching device connected to a second data line. A first data voltage through the first data line is applied to the first horizontal electrode through the first switching device and a second data voltage through the second data line is applied to the second horizontal electrode through the second switching device so that a voltage difference between the first data voltage and the second voltage may be image information.

In an IPS mode LCD device according to a second embodiment of the present invention, one switching device is formed at each unit pixel and a horizontal electrode is connected to the unit pixel. The horizontal electrode includes a first horizontal electrode formed at the $N^{th}$ unit pixel and a second horizontal electrode formed at the $N-1^{th}$ unit pixel. The first horizontal electrode and the second horizontal electrode are formed as a unit. Also, a horizontal field is formed by an $N^{th}$ data voltage applied to the first horizontal electrode from the $N^{th}$ data line and by an $N+1^{th}$ data voltage applied to the second horizontal electrode from the $N+1^{th}$ data line, and the voltage difference between the $N^{th}$ data voltage and the $N+1^{th}$ data voltage realizes an image information of unit pixel.

Figure 3:
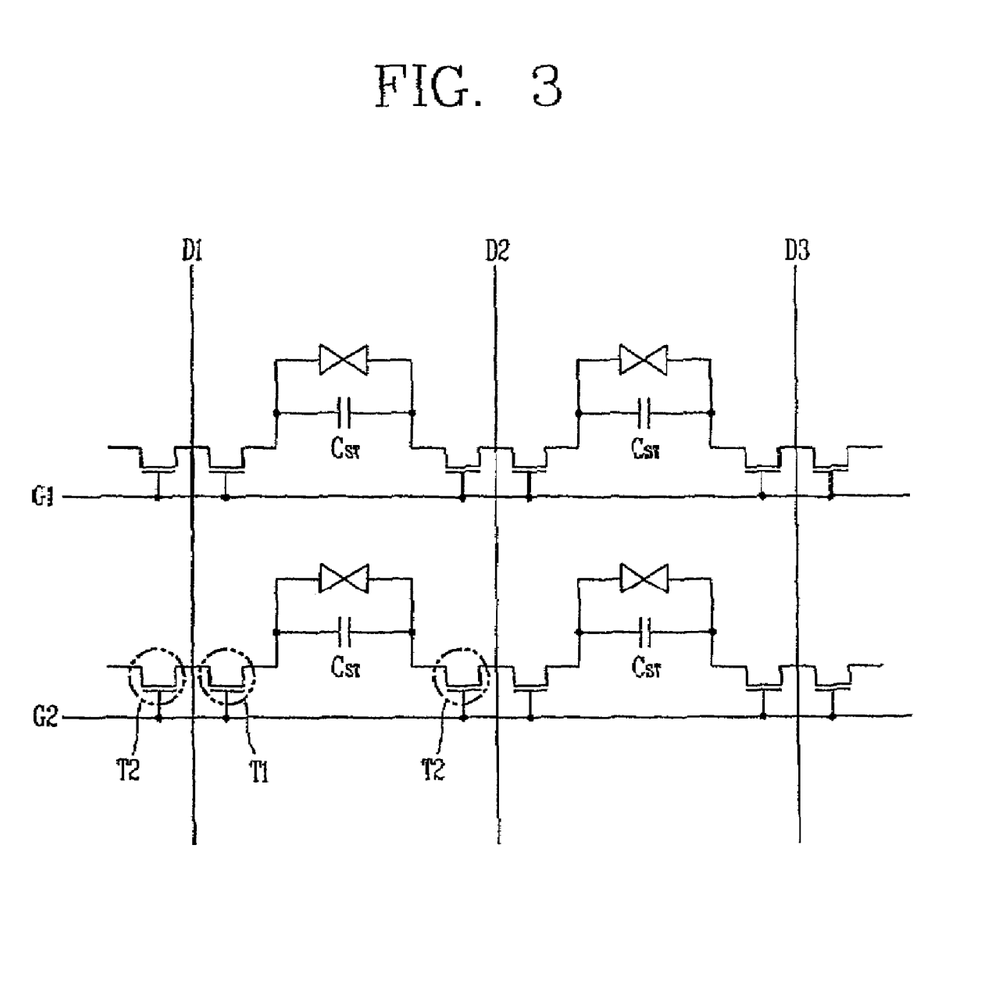
FIG. 3 is a circuit diagram of a unit pixel according to a first embodiment of the present invention.

FIG. 3 is a circuit diagram of a unit pixel according to a first embodiment of the present invention. As shown, a unit pixel is defined by a plurality of gate lines G1, G2, G3 . . . and a plurality of data lines D1, D2, D3 . . . crossing to each other.

A pair of TFTs (T1 and T2) are respectively provided at each unit pixel as a switching device, and the TFTs are connected to horizontal electrodes. The horizontal electrodes are in parallel with each other, and a capacitor is formed between the horizontal electrodes and a liquid crystal layer therebetween. Between the horizontal electrodes, a horizontal field is formed by voltages applied from the data lines, and a capacitor is formed.

Figure 4A:
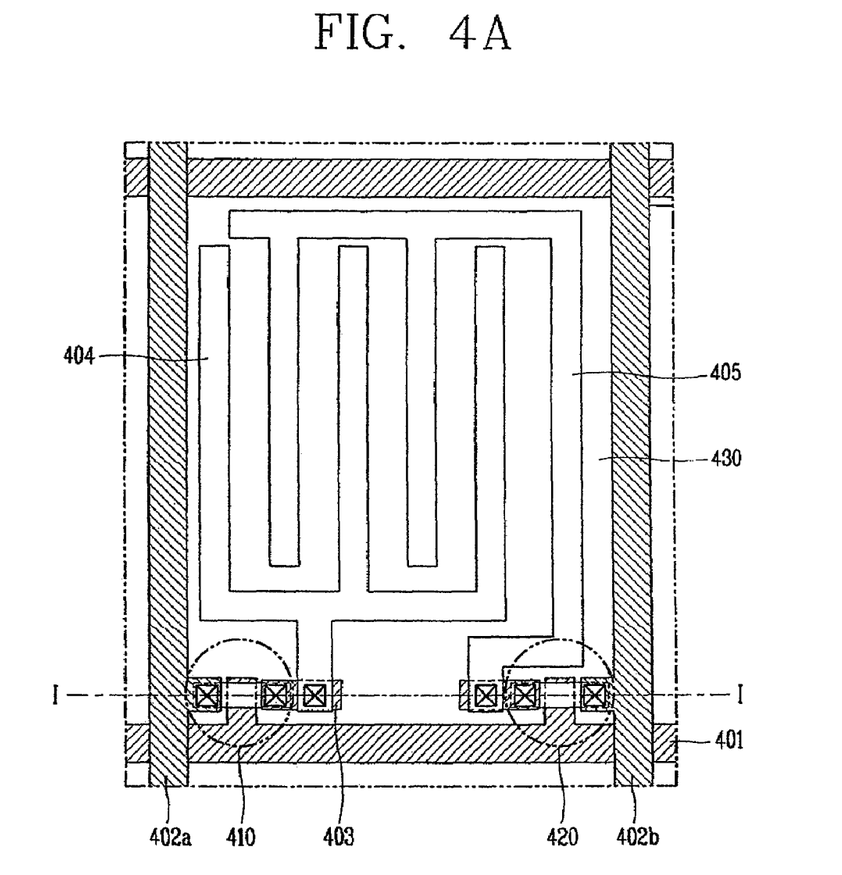
FIG. 4A is a plane view showing the unit pixel according to the first embodiment of the present invention.
Figure 4B:
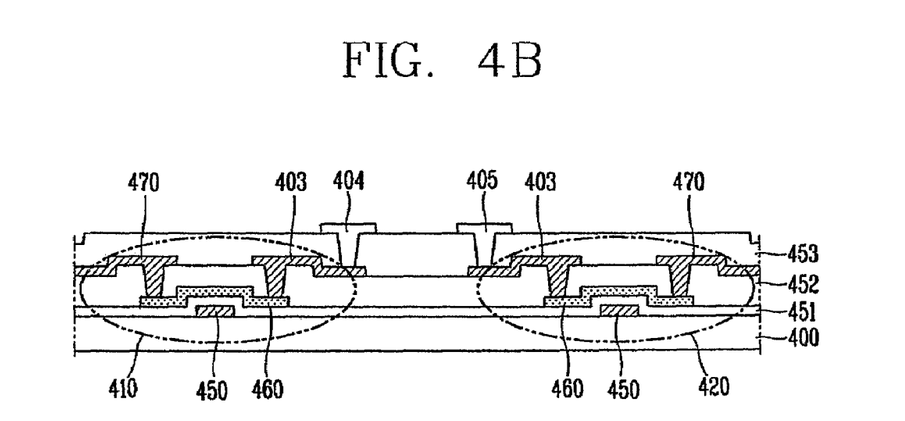
FIG. 4B is a sectional view showing the unit pixel according to the first embodiment of the present invention.

FIGS. 4A and 4B show the unit pixel according to the first embodiment of the present invention.

Referring to FIG. 4, a plurality of gate lines 401 are formed to cross a plurality of data lines 402a and 402b thereby to define a unit pixel 430. The unit pixel 430 is provided with a pair of TFTs 410 and 420, switching devices. The pair of TFTs are a first TFT 410 and a second TFT 420.

The first TFT 410 is formed at an intersection between the gate line 401 and the first data line 402a, and the second TFT 420 is formed at an intersection between the gate line 401 and the second data line 402b.

The first TFT 410 is connected to a first horizontal electrode 404 through a drain electrode 403 thereof, and the second TFT 420 is connected to a second horizontal electrode 405 through a drain electrode thereof. The first horizontal electrode 404 and the second horizontal electrode 405 may be respectively provided with one or at least two sub electrodes in parallel with each other. The first horizontal electrode 404 and the second horizontal electrode 405 are in parallel with each other, and form a horizontal field by voltages applied from the first data line 402a and the second data line 402b. Liquid crystal is driven by the horizontal field.

The first horizontal electrode 404 and the second horizontal electrode 405 may be formed of a transparent material on the same layer. Also, as shown in FIG. 5A, one may be formed of a transparent material and another may be formed of a opaque material such as a gate electrode forming material.

Figure 5A:
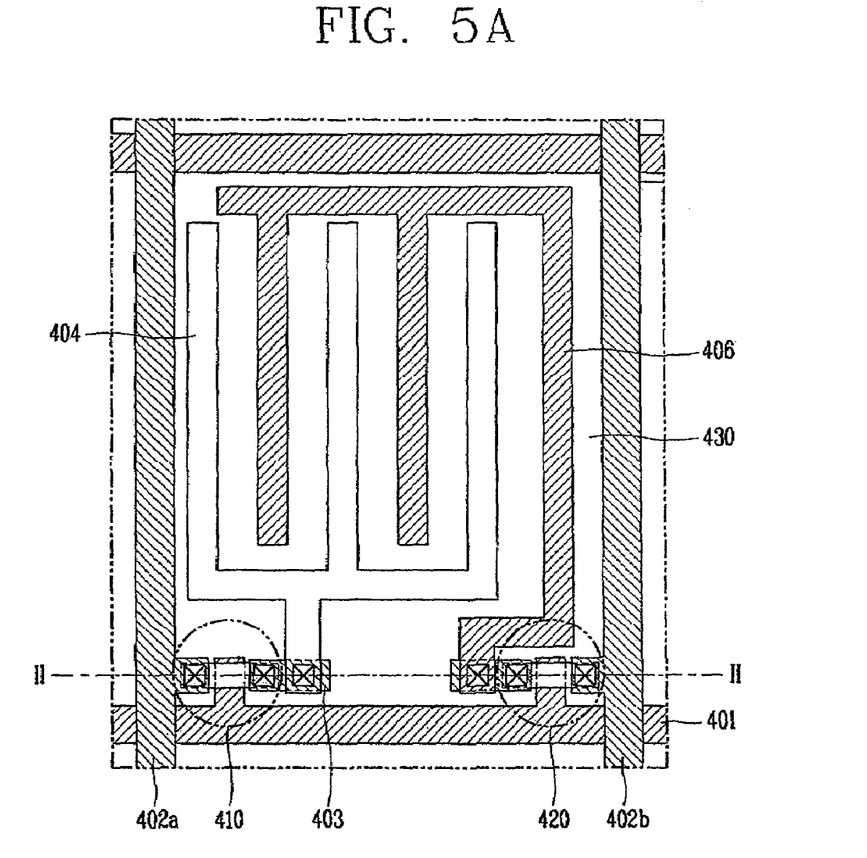
FIGS. 5A and 5B are respectively a plane view and a sectional view showing another construction of the first embodiment of the present invention.

The LCD devices shown in FIGS. 4A and 5A have the same function even if they are different from each other according to a process step of a horizontal electrode.

As shown in FIG. 4A, the first horizontal electrode 404 and the second horizontal electrode 405 are formed of a transparent material to increase an aperture ratio.

As aforementioned, in the LCD device according to the first embodiment of the present invention, the first TFT and the second TFT are provided at each unit pixel, and the first horizontal electrode and the second horizontal electrode are respectively connected to the first TFT and the second TFT to form a horizontal field. Accordingly, the structure is simpler than the related IPS mode LCD device for generating a horizontal field using a common electrode and a pixel electrode, and the aperture ratio is increased.

In the related IPS mode LCD device, a common electrode line and a gate line are simultaneously formed, and the common electrode line and the gate line are formed to be adjacent to each other as much as possible in order to increase an aperture ratio of unit pixel region. However, during the process, a short-circuit between the gate line and the common electrode line may be generated, and a rework process for repairing the shorted gate line is required.

On the contrary, in the present invention, a common electrode line is not formed. This accordingly does not cause a short-circuit between the common electrode line and a gate line and thereby a rework process for repairing a short-circuited gate line may be avoided.

In the related IPS mode LCD device, a horizontal field is formed by a common electrode to which a common voltage is applied and a pixel electrode to which a data voltage is applied from a data line thereby to realize image information. However, the present invention is not provided with a common electrode thereby to realize image information in a different way from the related art. That is, in the present invention, image information is realized by a voltage difference between the first data voltage and the second voltage simultaneously applied to the unit pixel.

Hereinafter, an operation for realizing image information will be explained in more detail.

When a scan signal is applied to gate lines one by one from a gate driving circuit, channels of the first TFT 410 and the second TFT 420 of each unit pixel connected to the gate lines are turned on. Then, data signals are applied to each TFT as much as an amount corresponding to one gate line through data lines.

Accordingly, a first data signal is applied to the first horizontal electrode 404 through the first data line 402a and the first TFT 410, and a second data signal is applied to the second horizontal electrode 405 through the second data line 402b and the second TFT 420. By data voltages applied to the first horizontal electrode and the second horizontal electrode, a horizontal field is generated between the first horizontal electrode and the second horizontal electrode thereby to drive liquid crystal.

Since liquid crystal has to be driven by the data voltages applied to the first horizontal electrode and the second horizontal electrode, a voltage difference between the two data voltages is equal to a voltage difference between the related common voltage and the pixel electrode.

Therefore, the first data voltage and the second data voltage are different from those of the related art. Also, the first and second data voltages are adjusted so that a voltage difference between the first data voltage and the second data voltage may be equal to a voltage difference between the common voltage and the pixel electrode of related art. That is, two data voltages are applied to each unit pixel by an adjustment so that a voltage difference between the two data voltages may be realized as image information.

The first and second data voltages are adjusted by a timing controller. First, external data signals are adjusted by the timing controller thereby to generate adjusted data signals. Then, the data signals are applied to the data lines thereby to realize image information.

At the time of applying data signals to horizontal electrodes, a capacitor is formed between the horizontal electrodes to serve as a storage capacitor for maintaining image information of the unit pixel for a certain time.

FIG. 4B is a sectional view taken along line I-I in FIG. 4A showing the first embodiment of the present invention.

Referring to FIG. 4B, two TFTs 410 and 420 are formed at each unit pixel, and horizontal electrodes 404 and 405 are connected to the TFTs.

More specifically, a gate electrode 450 is formed on a substrate 400, and the gate electrode 450 is insulated by a gate insulating layer 451. On the gate insulating layer 451, an active layer 460 containing a semiconductor is formed. The active layer 460 is insulated by an interlayer 452.

On the interlayer 452, a source electrode 470 and a drain electrode 403 respectively connected to the active layer 460 are formed. A passivation layer 453 is formed on the source/drain electrodes.

Horizontal electrodes 404 and 405 connected to the drain electrode 403 are formed on the passivation layer 453. The horizontal electrodes are composed of a first horizontal electrode 404 and a second horizontal electrode 405 respectively connected to the pair of TFTs 410 and 420. The first and second horizontal electrodes 404 and 405 are formed of a transparent material to increase an aperture ratio.

In the LCD device according to the first embodiment of the present invention, the horizontal electrode may be formed of a same metal of a gate line.

FIG. 5A shows that one horizontal electrode between horizontal electrodes facing each other is formed of a same material of gate line.

The construction of FIG. 5A is the same as that of FIG. 4A except that a second horizontal electrode is formed of the same material as a gate line and is formed on the same layer as the gate line.

As shown in FIG. 5A, the second horizontal electrode 406 may be formed of a metal layer such as Al, Mo, etc., and may be simultaneously patterned in a process for forming a gate line.

Figure 5B:
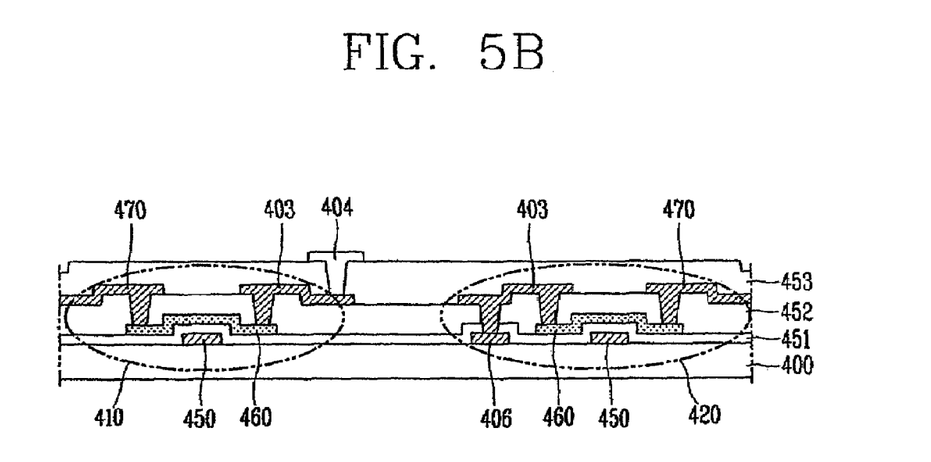

FIG. 5B is a sectional view taken along line II-II in FIG. 5A, which shows the second horizontal electrode 406 is formed on the same layer as a gate line 450 and is connected to a drain electrode 403 of a second TFT 420.

According to the first embodiment of the present invention, a pair of switching devices are formed at each unit pixel, and horizontal electrodes are connected to the switching devices. Accordingly, even if a linear resistance is greatly generated due to a long gate line, almost the same gate voltage is applied to a pair of TFTs formed at each unit pixel. Also, since image information is realized by a voltage difference between adjacent data voltages, a line delay may be removed.

Since the unit pixel is driven by the TFT inside the unit pixel and data voltages applied from adjacent data lines for defining each unit pixel, the TFT serves as a switching device having almost no deviation in the unit pixel even if the TFT serves as a switching device having different characteristics according to a position on the substrate. Accordingly, a picture quality lowering due to the deviation of the TFT may be prevented.

According to the present invention, it is also possible to construct one TFT at the unit pixel and to provide one horizontal electrode formed at two adjacent pixels to be connected to the drain electrode of the TFT.

Hereinafter, the LCD device according to the second embodiment of the present invention will be explained with reference to FIGS. 6 and 7.

Figure 6:
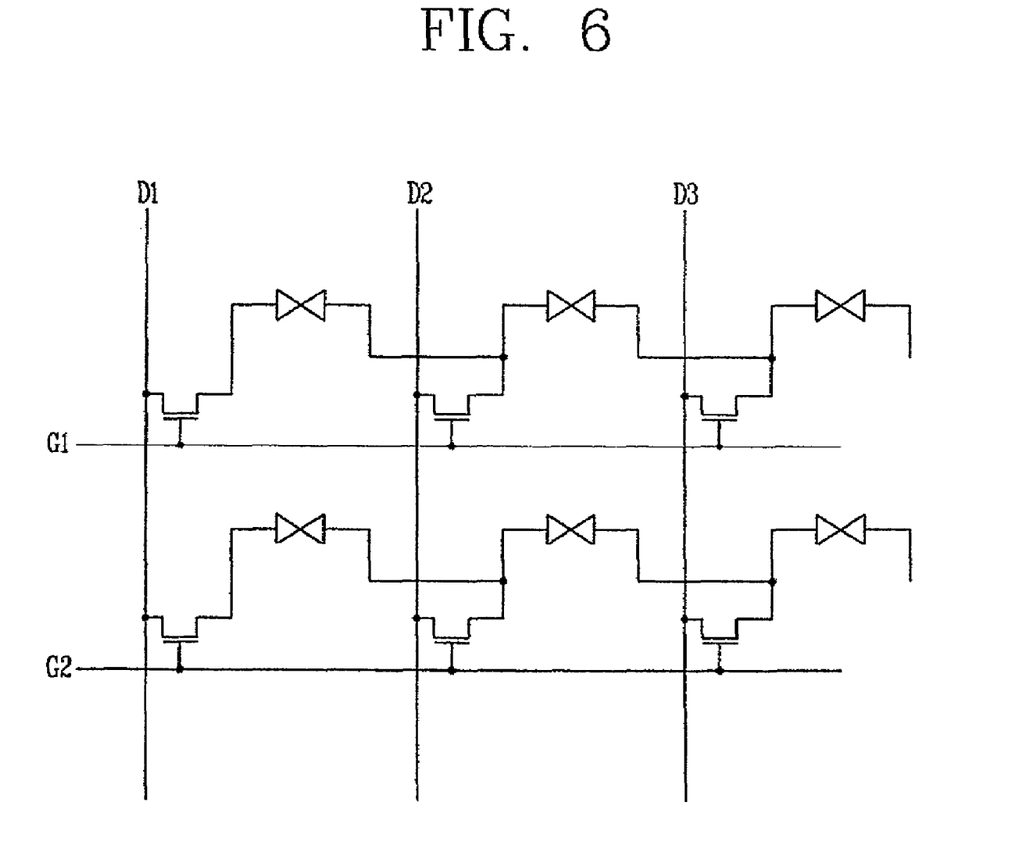
FIG. 6 is a circuit diagram showing a unit pixel according to a second embodiment of the present invention.

FIG. 6 is a circuit diagram showing a unit pixel according to a second embodiment of the present invention. Referring to FIG. 6, one TFT is provided at a unit pixel, and one horizontal electrode formed at two adjacent pixels is connected to the TFT.

The second embodiment of the present invention is different from the first embodiment in that one switching device is provided at each unit pixel, one integrated horizontal electrode is formed at two adjacent pixels, and the horizontal electrode is controlled by the switching device.

Figure 7:
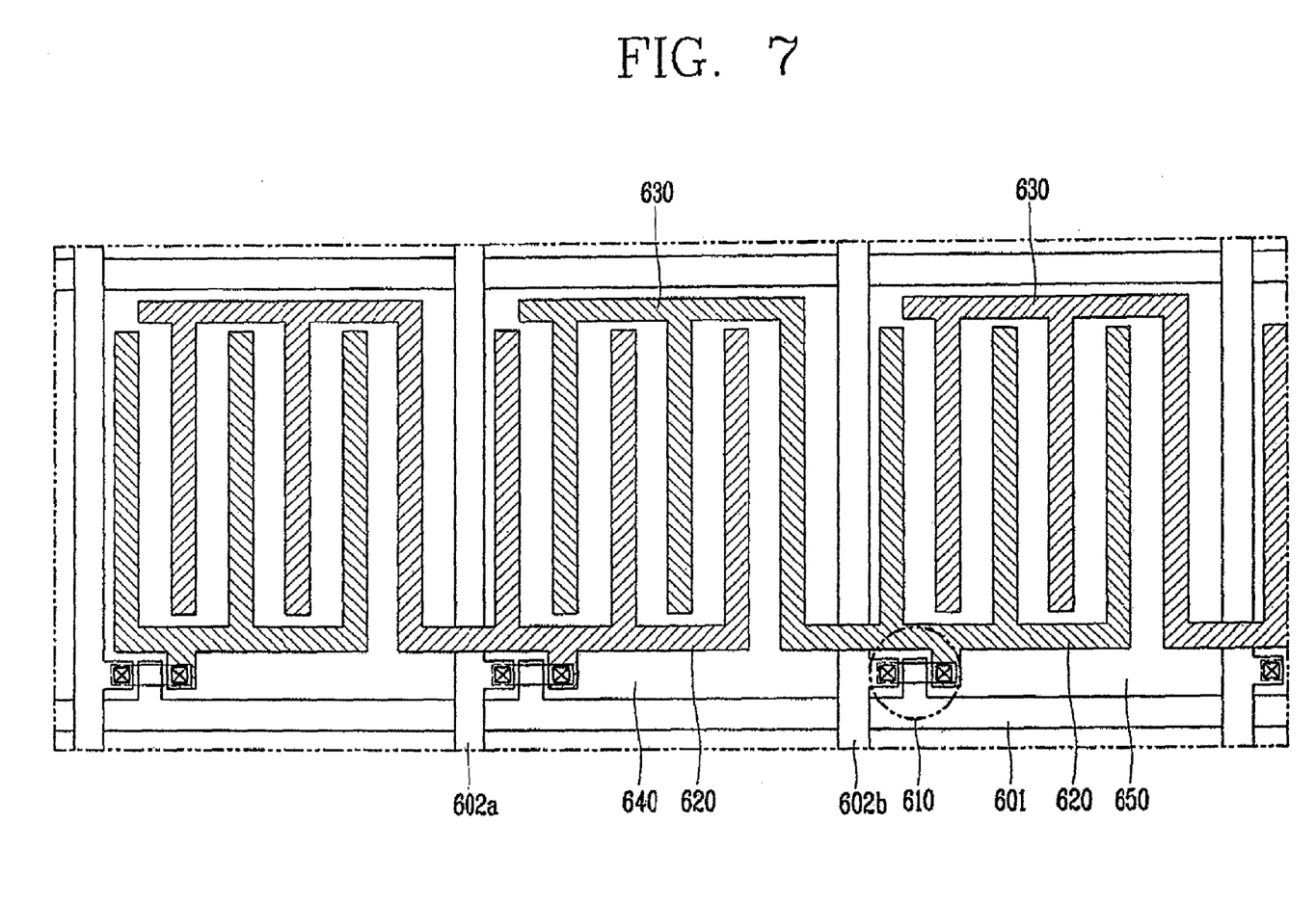
FIG. 7 is a plane view showing the unit pixel according to the second embodiment of the present invention.

FIG. 7 is a plane view showing the unit pixel according to the second embodiment of the present invention.

A structure and an operation of the LCD device according to the second embodiment of the present invention will be explained with reference to FIG. 7.

The LCD device according to the second embodiment of the present invention comprises: unit pixels 640 and 650 defined by a plurality of gate lines 601 and a plurality of data lines 602a and 602b crossing to each other; one TFT 610 formed at each unit pixel; and a horizontal electrode integrally formed at adjacent unit pixels to be connected to the switching device.

The horizontal electrode includes a first horizontal electrode 620 and a second horizontal electrode 630 integrally formed at adjacent unit pixels.

The first horizontal electrode 620 is formed at the $N^{th}$ unit pixel and the second horizontal electrode 630 is formed at the $N-1^{th}$ unit pixel positioned at the left side of the $N^{th}$ unit pixel in FIG. 7, so that one horizontal electrode is formed at two adjacent unit pixels.

The first horizontal electrode 620 and the second horizontal electrode 630 may be further provided with a plurality of sub parallel horizontal electrodes in parallel, and are in parallel with horizontal electrodes formed at an adjacent unit pixel. That is, since the first horizontal electrode and the second horizontal electrode are integrally connected to each other at each unit pixel, the first and second horizontal electrodes 620 and 630 are together formed at an arbitrary unit pixel and the two horizontal electrodes are in parallel with each other. Also, the first and second horizontal electrodes 620 and 630 formed at one unit pixel are driven by a different TFT formed at an adjacent unit pixel thereby to form a horizontal field.

The LCD device according to the second embodiment of the present invention comprises one TFT formed at each unit pixel, the first horizontal electrode 620 formed at the $N^{th}$ unit pixel, and the second horizontal electrode 630 extended from the $N+1^{th}$ unit pixel adjacent to the $N^{th}$ unit pixel. The first and second horizontal electrodes are in parallel with each other.

Hereinafter, an operation of the second embodiment of the present invention will be explained as follows.

The second embodiment is equal to the first embodiment in that a horizontal field is formed by data voltages provided through adjacent data lines and liquid crystal is driven by the horizontal field. However, the second embodiment is different from the first embodiment in that the data voltages are controlled by one TFT formed at each unit pixel.

Referring to FIG. 7, when a scan signal is applied to gate lines one by one from a gate driver (not shown), the plural TFTs 610 formed at the gate lines are turned on.

Then, data voltages applied from a data driver (not shown) are applied to each horizontal electrode through each TFT connected to each data line.

Referring to the unit pixel 640 of FIG. 7, the TFTs are turned on by gate signals, and then first and second data voltages are respectively applied to the TFTs through the first data lines 602a and the second data lines 602b.

The first data voltage inputted through the first data lines 602a is applied to the first horizontal electrode 620, and the second data voltage inputted through the second data lines 602b is controlled by the TFT connected to the data lines 602b to be applied to the second horizontal electrode 630. Therefore, a horizontal electrode is formed by the first horizontal electrode 620 to which the first data voltage is applied and the second horizontal electrode 630 to which the second data voltage is applied, and liquid crystal is driven by the horizontal electrode.

Since a voltage difference between the first data voltage and the second data voltage is realized as image information for driving the unit pixel, data voltages are applied to horizontal electrodes in a different way from the conventional IPS mode LCD device for realizing image information by applying data voltages to a common electrode and a pixel electrode.

That is, since image information is determined at each unit pixel by a voltage difference between two data voltages applied from two adjacent data lines, data voltages are adjusted by a timing controller before providing data signals to a data driver so that a voltage difference between the $N^{th}$ unit pixel and the $N+1^{th}$ unit pixel may be realized as image information.

Since a horizontal field may be formed at the unit pixel by individually provided data voltages, a line delay phenomenon is not caused even if a linear resistance is generated due to a long gate line.

That is, in the related art, a voltage of a pixel electrode is determined by a gate voltage and a data voltage, and image information is realized by the pixel voltage and a common voltage. However, in the present invention, image information is determined by a voltage difference between adjacent data voltages, so that problems due to a line delay are not generated if adjacent TFTs formed at the unit pixels have almost the same characteristic. Also, lowering of the picture quality can be mitigated if adjacent TFTs have similar characteristics even if the TFTs have different characteristics according to a position on a substrate.

As aforementioned, in the present invention, a line delay resulting from a long gate line and a linear resistance is increased as an LCD device becomes large can be reduced by generating a horizontal field at each unit pixel by data voltages applied from adjacent data lines. Also, since there is no deviation between adjacent TFTs even if the TFTs have different characteristics according to a position on a large substrate, lowering of the picture quality can be prevented. Additionally, since the present invention is not provided with a common electrode, the decrease of the aperture ratio due to the common electrode is prevented and the processes for forming gate lines are simplified, thereby simplifying the entire processes.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An in-plane switching (IPS) mode display device comprising:
   a pixel defined by a plurality of gate lines and a plurality of data lines crossing each other;
   a switching device formed at the pixel; and
   a first electrode and second electrode formed at the pixel, the first electrode connected to the switching device and the second electrode extending from the first electrode formed at an adjacent pixel.

2. The display device of claim 1, wherein the first electrode and the second electrode are formed as a unit.

3. The display device of claim 1, wherein the first electrode and the second electrode are disposed parallel with each other.

4. The display device of claim 3, wherein the first electrode at an $N^{th}$ pixel is connected to an $N^{th}$ data line and the second electrode at the $N^{th}$ pixel is connected to an $N+1^{th}$ data line to respectively receive a data signal.

5. The display device of claim 4, wherein a voltage difference between the first electrode and the second electrode is realized as image information.

6. The display device of claim 1, wherein only a single switching device is formed at the pixel.

7. An in-plane switching (IPS) mode display device comprising:
- a pixel defined by a plurality of gate lines and a plurality of data lines crossing each other;
- a switching device formed at the pixel; and
- a first electrode and a second electrode disposed at the pixel, the first electrode connected with one of the data lines through the switching device and the second electrode connected with another of the data lines.

8. The display device of claim 7, wherein the second electrode extends from a first electrode formed at another pixel.

9. The display device of claim 8, wherein the other pixel is adjacent to the pixel.

10. The display device of claim 9, further comprising a substrate on which the first and second electrodes and gate and data lines are disposed, the second electrode disposed farther from than the substrate than the data lines when the second electrode crosses the other data line.

11. The display device of claim 7, wherein the second electrode is connected with the other of the data lines through another switching device at the pixel.

12. The display device of claim 11, wherein the first and second electrodes do not overlap each other.

13. The display device of claim 11, wherein the first and second electrodes do not overlap the gate or data lines.

14. The display device of claim 7, wherein only a single switching device is formed at the pixel.

15. The display device of claim 7, wherein the pixel is devoid of a common electrode.

* * * * *

UNITED STATES PATENT AND TRADEMARK OFFICE
CERTIFICATE OF CORRECTION

PATENT NO. : 7,656,492 B2 Page 1 of 1
APPLICATION NO. : 12/345235
DATED : February 2, 2010
INVENTOR(S) : Jong-Jin Park It is certified that error appears in the above-identified patent and that said Letters Patent is hereby corrected as shown below:

On the Title Page

Left column, before item (51), insert a new item as follows:

--(30) Foreign Application Priority Data

December 31, 2004    Korea    118365/2004--.

Signed and Sealed this

Seventeenth Day of August, 2010

David J. Kappos
*Director of the United States Patent and Trademark Office*